United States Patent
Patwardhan

(10) Patent No.: US 7,481,057 B2
(45) Date of Patent: Jan. 27, 2009

(54) LOW COST SOLAR ENERGY EXTRACTION

(76) Inventor: Niket Keshav Patwardhan, 3673 Deedham Dr., San Jose, CA (US) 95148

( * ) Notice: Subject to any disclaimer, the term of this patent is extended or adjusted under 35 U.S.C. 154(b) by 439 days.

(21) Appl. No.: 10/394,849

(22) Filed: Mar. 22, 2003

(65) Prior Publication Data

US 2004/0020528 A1 Feb. 5, 2004

Related U.S. Application Data

(60) Provisional application No. 60/369,059, filed on Apr. 1, 2002.

(51) Int. Cl.
*B60K 16/00* (2006.01)

(52) U.S. Cl. .................................. 60/641.8; 60/641.11

(58) Field of Classification Search ................. 60/641.8, 60/641.11, 641.12
See application file for complete search history.

(56) References Cited

U.S. PATENT DOCUMENTS

| 2,680,565 | A | * | 6/1954 | Lof | 126/591 |
| 4,064,705 | A | * | 12/1977 | Edwards et al. | 62/149 |
| 4,156,419 | A | * | 5/1979 | Lewis, Sr. | 126/667 |
| 4,899,728 | A | * | 2/1990 | Peter et al. | 126/622 |
| 5,417,057 | A | * | 5/1995 | Robey | 60/269 |
| 5,894,837 | A | * | 4/1999 | Groesswang | 126/666 |

* cited by examiner

*Primary Examiner*—Hoang M Nguyen

(57) ABSTRACT

While solar energy is widely available, current means to harness it are sufficiently expensive that for most applications it is not economically viable. The basic problem is that solar energy is not sufficiently concentrated, and the cost of the collector becomes the limiting factor. This invention teaches a way of building a solar collector and an associated energy conversion engine that together allow one to build cost effective solar electric systems that can compete with natural gas based power plants.

5 Claims, 4 Drawing Sheets

LOW COST SOLAR ENERGY EXTRACTION

CROSS REFERENCE TO RELATED APPLICATIONS

This application claims the benefit of the filing date of a previously filed provisional U.S. patent application 60/369,059 filed Apr. 1, 2002.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention is related to the class of systems and devices to produce power from solar energy. Related areas include gas engines and compressors.

While solar energy is widely available, current means to harness it are sufficiently expensive that for most applications it is not economically viable. The basic problem is that solar energy is not sufficiently concentrated, and the cost of the collector becomes the limiting factor except in limited applications such as heating household water, swimming pools or intake air for large buildings. The cost of land by itself usually makes solar power non-competitive. However, solar energy is "free", so if one can build a solar collector cheap enough and installable on land that is also used for another purpose, relatively inefficient systems can be competitive with natural gas based power plants. In practice, this means solar collectors must be flat, act as either the roof or walls of a building or other structure, not leak or contain high pressures or dangerous fluids, and be aesthetic. Photovoltaics can meet these requirement, but material costs by themselves put a floor on the cost of photovoltaic systems that makes them non-competitive with commercial power generation. For a rough comparison, commercially available systems have 7 to 11% efficiency, and cost $4 to $9 per watt of output. As structural material this translates to $40-$100 per square foot. Current roofing material costs range around $1-3/sq foot. Effective power cost ranges between $0.25 and $1/Kwh. In both cases this is at least one order of magnitude too high, maybe even two.

Thermal collectors can be made flat and cheap. There are numerous systems on the market today that can achieve 20-80 degrees Kelvin temperature rise under full sun conditions, and are used to generate hot water or air for space heating. Web page reference [1] (see below) provides a good overview of solar collectors. Reference [2] provides detail on one low temperature application of solar collectors—indoor air heating. Reference [5] is a good review of the state of the art in heat control window glazings. The challenge in harnessing solar power using thermal collectors for non-thermal uses is to get the temperature up to the point where useful amounts of available energy can be produced. For flat plate collectors this is a particular challenge since there is a large area exposed to the environment. Current flat plate collectors tend to lose a lot of the heat collected, because the surface in contact with the environment is heated significantly. Thermal sweep systems (see related patents below) can reduce heat losses to near zero, but current systems are opaque and thus not applicable to a solar collector. So one would like to keep the temperature increment small.

On the other hand, with small temperature increments thermodynamic efficiencies are low. Even worse, since the circulating power is high in such scenarios, small inefficiencies in the components of the conversion equipment translate into relatively large reductions of output power—sometimes even making it disappear altogether. For example, in a Brayton cycle operating at 10% thermodynamic efficiency, the power fed back from the output turbine to the compressor can exceed 9 times the output power. If the turbine+compressor loses 1% (i.e. it is 99% efficient) the output power is reduced 10%. If it loses 10% (a more realistic number) we get no output power at all! Thus we need the components of the heat engine to be super efficient, and we would like to have the temperature increment be as high as possible.

Another issue with solar power is what happens if there is a power demand during the night, or when it is overcast. Photovoltaics can continue to generate power (albeit at a lower level) on overcast days—any alternative system must also be able to do so. Sufficient storage combined with excess capacity can resolve this. Current battery systems by themselves cost enough to blow away the economics of a solar system. As a result, current photovoltaic systems rely on a complicated interface to the electrical grid and a legal requirement on the electrical utility to support "net metering" to effectively store in the utility system the excess power on a sunny day. Because current heat engines need most of the heat input at high end of the temperature range, current thermal storage systems for a days worth of storage are either too large to make sense or use special (expensive) materials to store a lot of heat at the high end of the temperature range using some kind of phase change.

REFERENCE MATERIAL

Patents:
U.S. Pat. No. 6,302,100 System for collimating and concentrating direct and diffused radiation
U.S. Pat. No. 4,846,151 Solar collectors
U.S. Pat. No. 4,899,728 Method and Apparatus for Preheating Ventilation Air for a Building.
U.S. Pat. No. 7,076,025 Solar steam boiler Gas Compression
---------------

RE37,603 Gas compressor
U.S. Pat. No. 6,336,317 Quasi-isothermal Brayton cycle engine
U.S. Pat. No. 5,641,273 Method and apparatus for efficiently compressing a gas
U.S. Pat. No. 5,239,833 Heat pump system and heat pump device using a constant flow reverse stirling cycle
U.S. Pat. No. 4,478,553 Isothermal compression
U.S. Pat. No. 4,461,154 Method and apparatus for compressing gas
U.S. Pat. No. 4,442,675 Method for thermodynamic cycle
U.S. Pat. No. 4,183,220 Positive displacement gas expansion engine with low temperature differential
U.S. Pat. Nos. 1,929,350; 2,280,845; 4,027,993 and 5,027,602 disclose some devices which were intended to provide isothermal compression by providing intimate contact between incompressible matter having an appreciable heat capacity and a gas undergoing a volume change.

Thermal Sweep Insulation
------------------------

U.S. Pat. No. 3,453,177 discloses a means for controlling the flow of heat to the walls of a concrete pressure vessel. More particularly, this invention discloses the provision of a layer of permeable thermal insulation spaced from and within the wall of a containment vessel so that a space is provided to allow water to flow through the space. The water permeates through the thermal insulation into thermal contact with a nuclear reactor wherein it is heated to make steam which is then conducted by outlet 9 to a "source of steam consumption (not shown) such as a steam turbine". The "source of steam consumption" is not located within the space contained within the pressure vessel or the thermal insulation.

U.S. Pat. No. 3,357,890 discloses pressure vessel thermal insulation for a nuclear reactor which uses a thermal barrier. In the first embodiment, fluid is passed through the barrier to thereby heat the fluid and help insulate the pressure vessel from the reactor and the hot water surrounding the reactor.

U.S. Pat. No. 3,489,206 discloses thermal shielding wherein a fluid is perfused through a porous material in a direction opposite to the direction of diffusion of heat to thereby minimize heat flow into a vessel containing the source of heat and surrounded by the shielding.

U.S. Pat. No. 1,469,458 relates to a kinetic heat insulation where a fluid passes between successive layers of a long tortuous path to an furnace or oven or other high temperature chamber located at the center of the insulation structure where the temperature of the fluid increases in steps.

Web Pages:
[1] www.solarserver.de/wissen/sonnenkollektoren-e.html—Overview of solar collectors
[2] www.eren.doe.gov/femp/prodtech/transfta.html—Transpired air collectors
[3] www.solgels.com/prodol.htm—"Black Crystal" product specification
[4] adsabs.harvard.edu/cgi-bin/nph-bib_query?1967STIN...7513169Y—Abstract of article about solar coating properties.
[5] www.pnl.gov/fta/13_glazings/13_glazings.htm—DOE article on selective glazings.
[6] www.oriel.com/???—ORIEL Instruments Web Catalog—Mirrors Technical Discussion
[7] www.nasatech.com/TSP/PDFTSP/LEW16064.pdf—Gold coat achieves 95% reflectivity with 80% transmission of light. Discussion is about transparent high temperature furnaces.

Other:
[8] Abrisa Hot Mirror #101 data sheet—dielectric mirror with 95% IR reflectivity
[9] Abrisa Hot Mirror #103 data sheet—dielectric mirror with 90% IR reflectivity I understand that web pages are volatile, so copies have been provided for non-government pages.

SUMMARY OF THE INVENTION

This invention teaches how to build a low cost solar system that heats air at ambient pressure in essentially flat collectors and uses this hot air in an engine to generate mechanical and/or electrical power. The use of ambient air allows the collector to be built with light, cheap materials, and together with the flat design allows it to be incorporated into other structures. The use of a cycle that heats the working fluid all the way from the low temperature point to the high temperature point improves the economics of the energy storage system, allowing us to use the entire temperature range for heat storage instead of just the top 1-10%. The engine implementing the cycle has properties that reduce mechanical losses thus allowing the system to generate mechanical energy even at low temperature differences.

DETAILED DESCRIPTION

Figure 1:
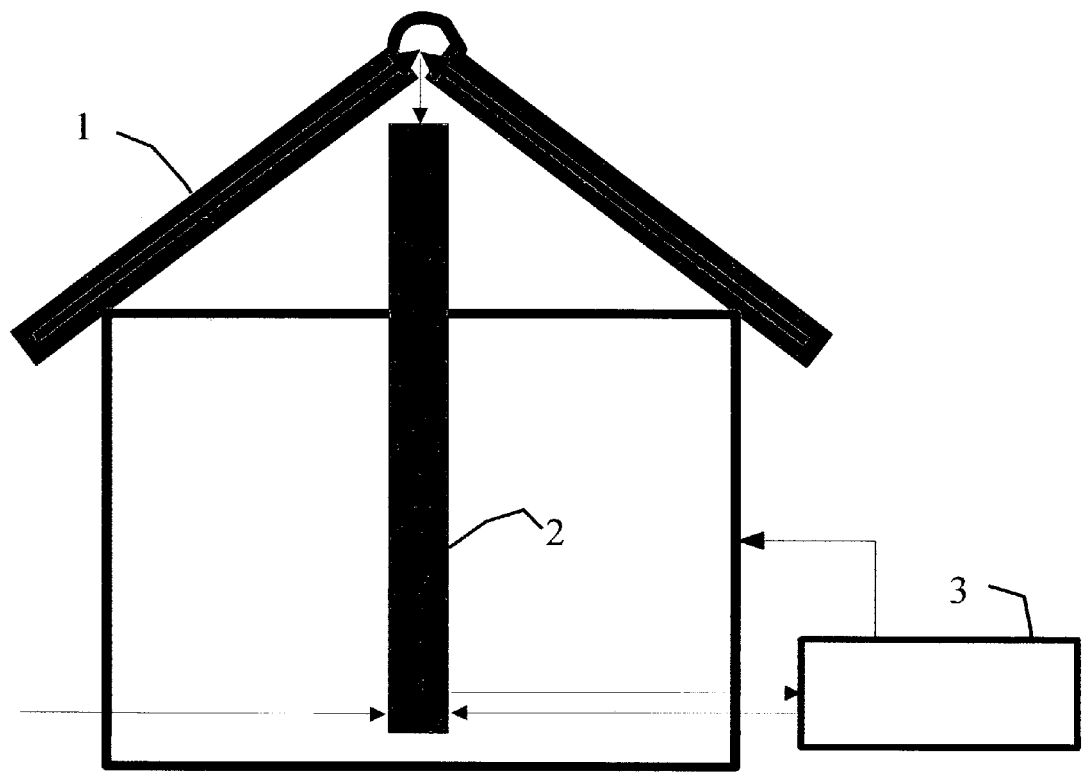
FIG. 1 shows an embodiment of the overall system. 1 is a solar collector described in detail in FIG. 2. 2 is a heat storage reservoir. 3 is an engine that takes heat from the reservoir and converts it to free energy, i.e. mechanical or electrical power.
Figure 2:
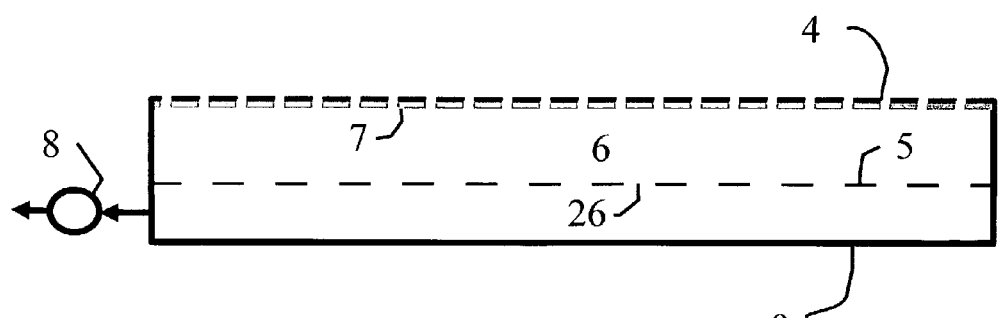
FIG. 2 shows the details of the solar collector. 4 is a screen that prevents external turbulence and wind from reaching the collector surface 5. A gap 6 separates the collector surface from the screen. Holes 26 in the collector surface collect the air in the gap that is heated by conduction from the collector surface. The collector surface or screen or both are either made of a material that reflects infrared radiation with a wavelength longer than about 3 microns, or have a coating 7 that does the same. A regulator or fan 8 ensures the hot air behind the collector surface is drawn out at an optimized rate. The back 9 and sides of the collector are thermally insulated to prevent heat losses in those directions.
Figure 3:
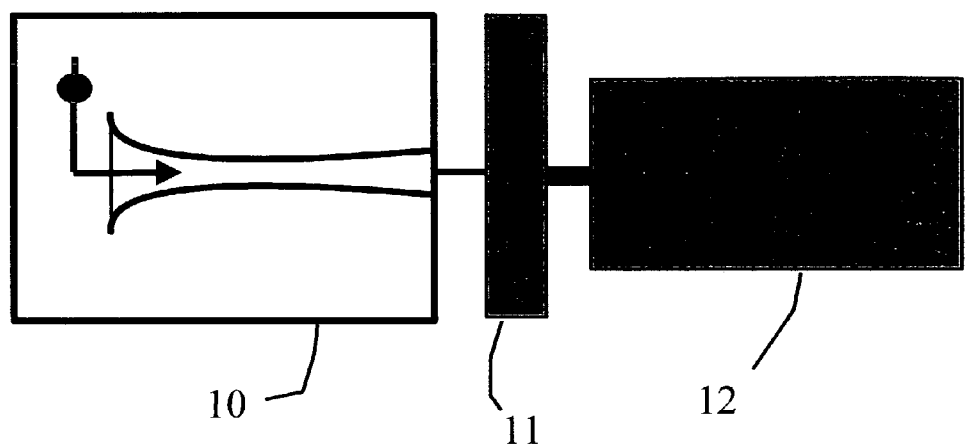
FIG. 3 shows the proposed engine. 10 is an air engine that takes in hot air at ambient pressure and water, and converts it into higher than ambient pressure air and water vapor, or fast moving air and water vapor at ambient pressure. It is shown in more detail in FIG. 4. 11 is a turbine that converts the higher pressure or moving air into mechanical energy, and 12 is a generator that converts the mechanical energy into electrical power.

FIG. 1 shows a complete system. The first part of the system is the solar collector 1, shown in FIG. 2. To make them cheap, they are do not track the sun and are designed to be nearly flat so they can be part of an existing structure such as a roof. A screen 4 made of wire mesh or a transparent material with small holes or passages in it separates the collector surface 5 from ambient temperature air (and winds) by a minimum air gap 6 thus establishing a minimum R value for thermal conduction losses. The screen acts as a transparent turbulence barrier and sets up the conditions for a laminar air flow towards the collector surface 5 rather than across it. Holes 26 in the collector surface 5 allow the heated air next to the surface to be drawn into the collector and replaced by cooler air further away and eventually from outside the screen. The available heating rate and the air flow define the maximum temperature rise;—the temperature rise, thermal conductivity of air and heating rate define the maximum distance at which air can be significantly heated by the surface. So if the gap between the screen 4 and surface 5 is large enough no heated air can be present next to the screen. By using air as the heat carrier we are able to retrieve the air heated by thermal conduction and prevent its escape, reducing the thermal conduction loss to zero. In effect, with this arrangement we have created a transparent thermal sweep system. Obviously, if the flow is too fast, the temperature would not rise by enough. So a regulator 8 controls the airflow—this could be a small fan or just a damper if the rest of the system provides enough suction.

A calculation example would go as follows. Assume the heat rate was 100 w/sqm (the light energy available on a cloudy but otherwise bright day). The specific heat at constant pressure for air is 1006 J/kg. A temperature rise of 100 C would require the air flow be no greater than 1/1006 kg/sec, i.e. approximately 1 gm/sec. The conductivity of air is around 26 mW/meterK. Thus the temperature gradient near the collector has to be at least 3846 K/meter. With a 100 C temperature difference this translates into a scale height of 2.6 cm. 26 cm away from the collector surface there would be practically no heat transferred by conduction. Of course this analysis assumes the air flow is directly towards the collector surface—to ensure that this is true down to the scale height requires that the hole spacing in the collector surface must be less than this order of magnitude. In our experimental setup using agricultural ground cover as the collector surface 5, the hole spacing was ½ millimeter.

An airflow rate of 1 gm/sec/sqm translates into roughly 0.88 mm/sec of airflow at 300K. This should be sufficient to suppress any convective flow, particularly if additional stilling screens are installed between the collector surface 5 and the external turbulence screen 4. In a way one can think of the thermal sweep airflow as a technique for inverting the collector so that hot air goes down instead of up, allowing its insulating properties to be used even when the hotter zones are at the bottom. The resistance of the screen to airflow should be high; high enough so that pressure differences outside the screen do not create a backflow near any part of the collector surface.

The major loss is then radiation loss. This can be mitigated by a spectrally selective coating, that reflects wavelengths longer than about 3 microns, and transmits or absorbs the rest. The exact transition point is determined by the desired temperature. For example, the coating present on low-E glass or black copper does this. For the state of the art with respect to opaque coatings see reference [3] on "Black Crystal". The version that transmits shorter wavelengths would be applied to the underside of a transparent material screen. Putting the IR reflective coating 7 on the underside of the screen 4 ensures that it will not get a dust deposit, and protects it from the elements, thus preserving its reflectivity over a long period.

Also the screen itself will not get very hot, as it is cooled by the ambient air, and reflects back the heat from the collector surface 5. Note that water has very high emissivity in the infrared (~95%), so a very small amount of water on a surface will destroy its IR reflection properties. The same is true of most kinds of dust. It would be very convenient if one could arrange to illuminate a collector from the bottom instead of from the top, air would act as a natural transparent insulator without any convection losses, and the IR reflective coating would be protected from dust and water deposits. Unfortunately this is not the situation, and the best method of protecting the surface is to use a transparent coating on the underside of a transparent substance. However, using air and a highly reflective coating is a very good way to get highly efficient insulation for the back of the collector, which would normally be facing down.

Figure 6:
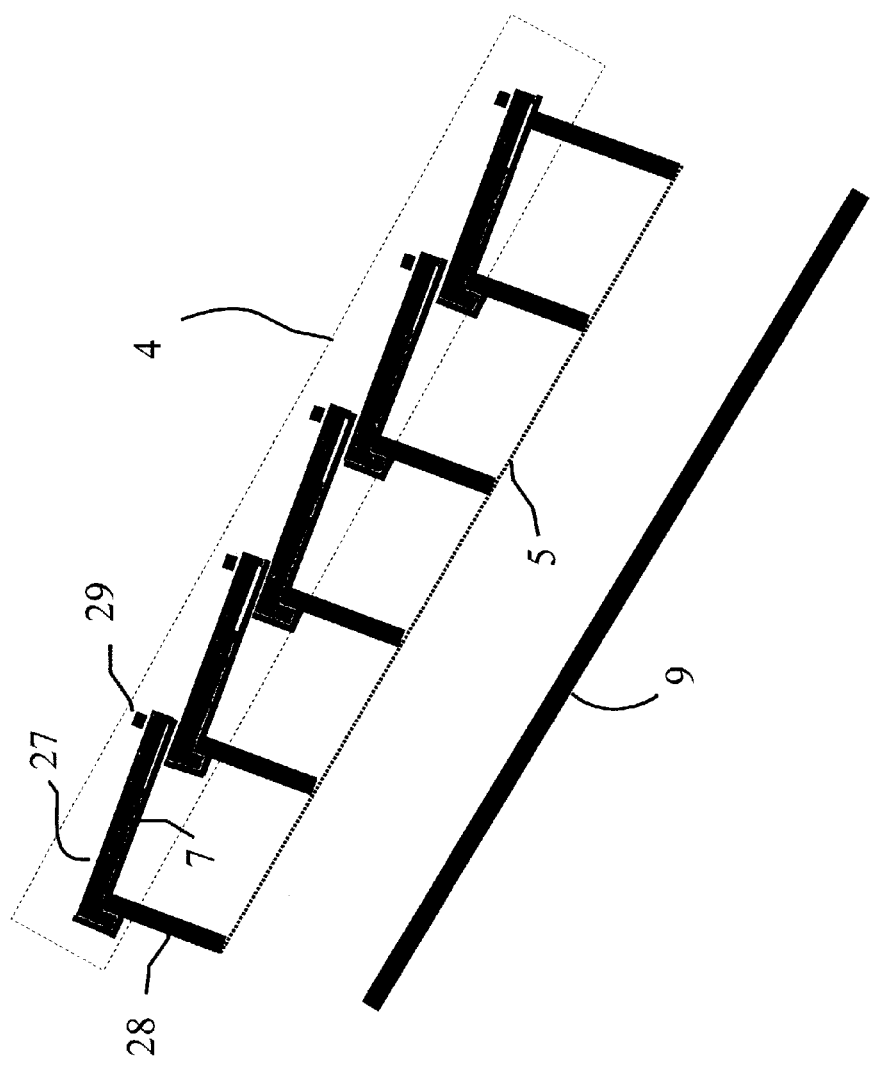
FIG. 6 shows an example of how a roof would be constructed to act as a solar collector. Glass tiles 27 coated on the underside with an IR reflective coating 7 would act as the screen 4. These tiles would also perform the normal function of tiles—shedding rainwater. If a glass look is undesirable, small ridges 29 on the top surface of the glass tile painted on their lower side give the roof any desired color when viewed from the street. A tightly woven non-flammable black cloth attached to the underside of the support beams 28 would act as the collector surface 5. Standard high efficiency insulation systems form the back 9 of the collector, i.e. the bottom surface of the roof.

For example, as in FIG. 6, we could make tiles out of glass, and coat the underside with a low-E coating such as offered by Pilkington Glass. A roof made of these glass tiles would act as the screen 4 and perform the normal function of a roof of keeping out rain and wind. A tightly woven non-flammable black cloth attached to the underside of the support beams 28 for the glass tiles would act as the collector surface 5. If one is not worried about flammability and can effectively control the airflow to prevent overheating (and melting!), one can use plastic agricultural ground cover as the collector surface 5. The only issue here is that the support beams 28 would need to have enough depth to maintain a sufficient air gap 6 between the glass tiles and the cloth. The small gaps in the weave of the cloth would act as the holes 26 in the collector surface 5. Standard high efficiency insulation techniques could be used to form the bottom surface 9 and sides of the collector or roof. Alternatively, one could underlay the roof with a film of vapor deposited aluminum, which would be 99% effective at preventing downward radiation, and since the air space under the roof is being heated from the top it would make a very effective insulator as no convection will be present. This would be the preferred embodiment when the solar system is being designed into a house, and would work well under full sun conditions. One should compare this with the system described in U.S. Pat. No. 4,899,728—where there is no screen to prevent turbulence from reaching the collector surface; the collector surface is exposed to the elements, thus allowing its thermal emission properties to degrade over time due to deposits and corrosion; and an additional layer under or behind the collector surface is required to perform the normal function of a roof or wall of keeping out the rain and wind. One can also design painted ridges 29 into the glass tiles, so that when viewed from the street the roof can have any desired color.

Overcast conditions are much harder to support, as the illumination can be as low as 30 W/sqm. To capture a significant fraction of the input energy, the energy radiated back should be less than 10 W/sqm. Given that at 400K a black body will lose almost 1000 W/sqm to 300K surroundings, we need IR reflectivity (in the wavelength range between approximately 3-40 microns) of better than 99% to achieve a loss of less than 10 W/sqm. Typical opaque solar coatings have IR emissivities of 8%, while transparent ones can get it down to 5% (see reference [7])—i.e. 50-80 W/sqm of radiation loss. This is sufficient to make the system usable on a bright day even with just the diffuse illumination (~100 W/sqm). While 99% IR reflectivity is difficult to achieve, it has been done with multilayer dielectric coatings (see references [6,8,9]). These can be applied to the underside of standard polycarbonate greenhouse roofing sheets acting as the turbulence screen 4. Placed on plastic film or thin plastic sheets, one could conceive of the costs coming down to a point where this can be applied as a layer in the roof system described above just under the glass—albeit with no treatment on the glass. As in the glass roof, the film will be maintained at a low temperature by the air flow, and by the fact that it absorbs very little of the incident radiation.

One of the considerations in such a solar collector is to match the airflow to the input power available. Since it is unlikely that the power drawn from the system exactly matches the power available one needs a reservoir that can store the excess hot air or heat, and resupply it at the rate desired. One can create a heat store simply by passing the hot air through sand, small stones or through pipes immersed in water. A fan 8 pulls hot air from the collectors at an optimized rate and delivers it to the heat store, which then delivers heat to the engine at the rate appropriate for the demand. If one can utilize the entire temperature difference between 300K and 400K, and one assumes a 10% conversion efficiency, approximately 3 cubic meters of water can hold enough energy to supply the average household for one day.

At this point we have a method to get very hot air cheaply from a solar collector. We now need to turn this hot air into useful energy.

The issue of most concern at this point is that we will not have a very large temperature difference between ambient and hot air and so the theoretical thermodynamic efficiency of any engine will be limited to about 10-20%. Most cycles will therefore have large recirculating mechanical power (at least 9 times the output at 10% efficiency), and small losses can result in no output power being available. So either the efficiency of the components must be extremely high, or the cycle must avoid recirculating work.

The Rankine cycle is one which can operate with these parameters. Isothermal expansion due to evaporation of water can be almost 100% efficient, as can isothermal compression due to condensation of steam. Only a very small portion of the work extracted by the adiabatic expansion of steam in the turbine or piston engine is required to pump the cool water from the low pressure region of the system to the high pressure region. Thus, while there might be a question of the efficiency, we can almost always get some work out of the system. Unfortunately, the cycle requires that most of the heat be supplied at a constant temperature, meaning that the collectors must contain and evaporate water directly; or one must accept the inefficiency caused by the mismatched heat curves of air and boiling water; or one must recycle slightly cooled hot air back to the collector, complicating the design significantly. Additionally, because the heat input is required at relatively constant temperature, a store of heat energy must be made of a material that has a phase change just above the evaporation temperature, or we must utilize only a small fraction of the stored heat energy.

In an alternate heat engine cycle, fluid is heated at constant pressure from the low temperature of the cycle to the high temperature. It is then adiabatically expanded to the low temperature, and then isothermally compressed back to the initial pressure. This type of cycle has approximately the same theoretical efficiency as a Carnot engine operating with one half of the temperature difference above the low temperature point. Obviously, work must be recycled from the adiabatic expansion process to the isothermal compression process. A large part of the losses in a gas engine come from friction, and from turbulence and shocks generated when the fast moving gas contacts a slow moving part of a turbine or compressor, or the fluid touches something at a significantly different temperature with the associated thermodynamic losses. What is not obvious is that the work need not be removed from the fluid in the expansion process and reinserted in the compression process—it can remain in the fluid until the compression is done, thus avoiding the losses in transferring the work between the fluid and the moving parts of the engine. The only thing that is required is that the heat generated by the compression be somehow removed as it is generated, thus ensuring the compression is isothermal. After compression is complete, the remaining work in the fluid can be extracted. Work can also be extracted at other points in the cycle.

Figure 4:
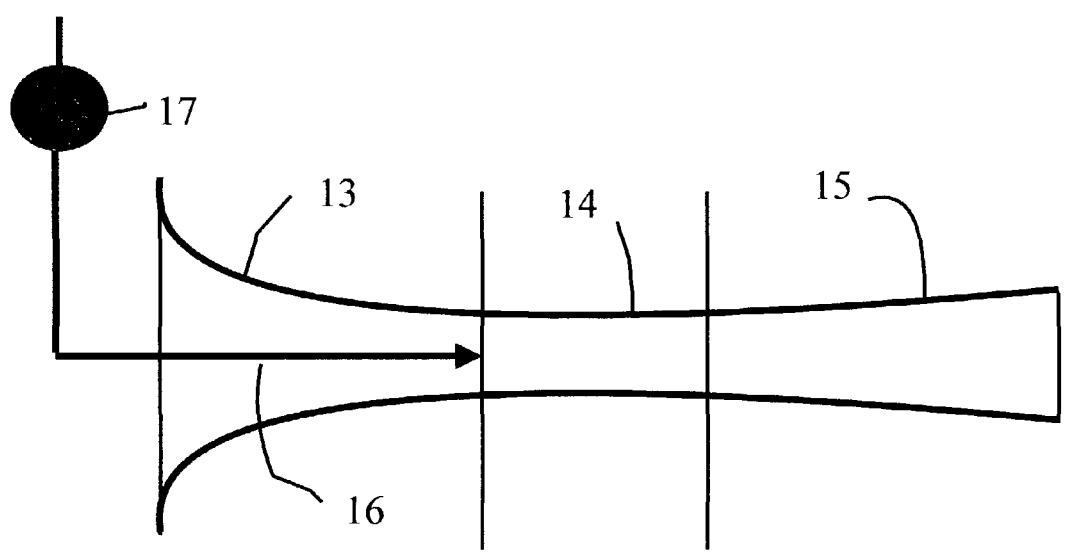
FIG. 4 shows the details of the linear form of the air engine. An accelerating section 13 is followed by a mixing section 14 and then a decelerating section 15. If the design is such that the air velocity at the mixing section is at or below the speed of sound this looks very much like a venturi tube. An injector 16 just before the mixing section atomizes and injects water into the mixing section at high velocity. A pump 17 creates the high pressure water needed for the injector.
Figure 5:
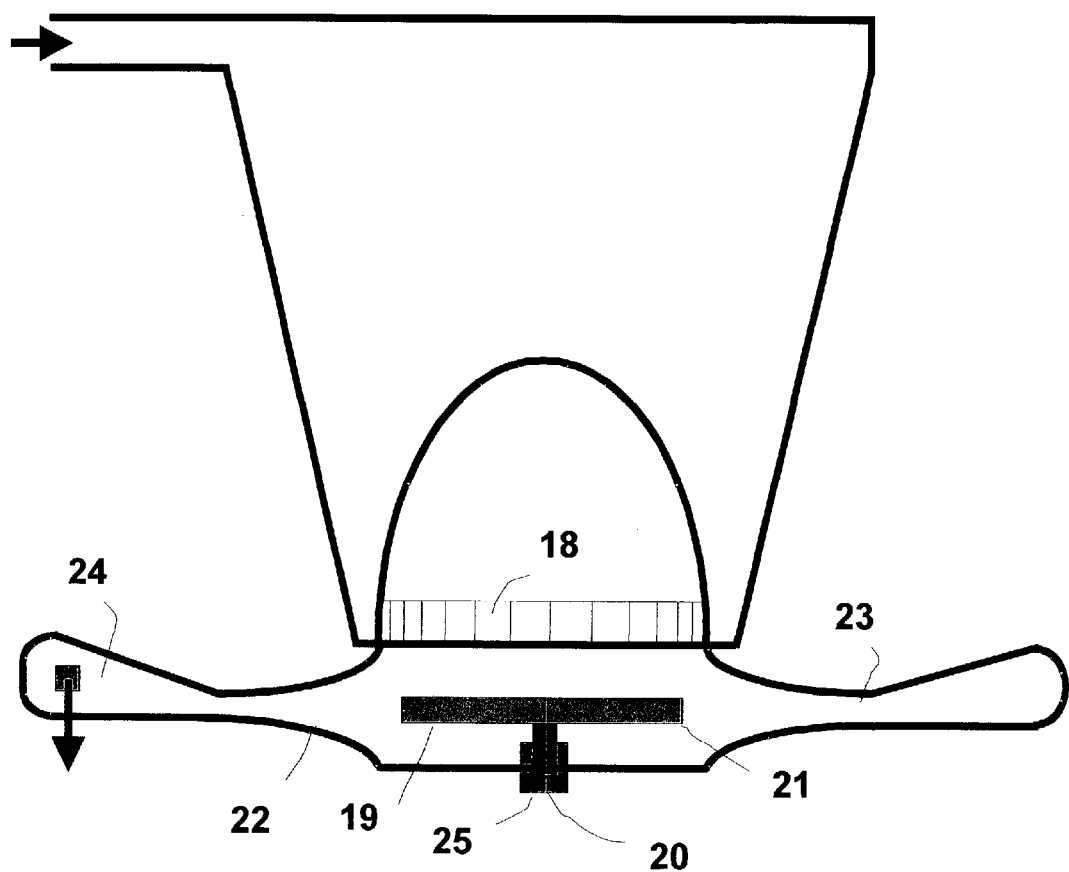
FIG. 5 shows an alternate form of the air engine. Nozzles 18 arranged in a circle create a spinning air mass around a spinning wheel 19. Water flows to the centre of the wheel via a pipe 20 in the axle of the wheel and is ejected at the rim 21. The enclosure 22 around the wheel is shaped so that a narrow gap 23 is aligned with the water spray, and expands out slowly into a collection chamber 24 around the gap. A motor 25 spins the wheel.

FIG. 4 shows one embodiment of the air engine, which looks very much like a Venturi tube when subsonic. An accelerating section 13 expands the air from ambient pressure and high temperature to low pressure and ambient temperature. If one uses the operating temperature points of 200 F and 100 F, the velocity of the air at the throat 14 should be just under the speed of sound, and the pressure should be about 0.56 atm. If we keep the velocity below sonic such an accelerating nozzle is just a convergent nozzle and has minimal losses—as low as 1%.

At the mixing section 14 we inject water at a velocity to closely match the air velocity. This requires a pressure of about 8400 psi which is provided by the pump 17. The pressure required can be lowered by heating the water first. The water nozzle or injector 16 is designed to atomize the water into very small droplets. Because we started with air at 100 F and at 1 atm, and now the same air is again at 100 F but at 0.56 atm, it has some capacity to absorb water—i.e. its RH is guaranteed to be below 100%. Therefore some of this water will evaporate, picking up heat from the air and cooling it, just as it would in an evaporative cooler. The air and water mixture then enters the divergent part 15 of the air engine, where it compresses adiabatically back to 1 atm. Because it is cooler and denser than the air that entered the throat section, and the remaining water continuously absorbs the heat of compression by evaporation, it will not require as much energy to compress back to 1 atm. The leftover energy will show up as residual kinetic energy at the exhaust, which can be harnessed by a turbine. Alternatively the compression can be allowed to continue until no kinetic energy remains, in which case the exhaust is at a pressure higher than ambient. This higher pressure air can then be used to drive a compressed air device, such as a turbine 11 and generator 12. If conditions are sonic, the compressor can just be a divergent channel (alternatively known as a diffuser) and can be designed with efficiencies of as high as 97%, especially if the divergence angle is maintained under 3 degrees. Interestingly, if the compression is near isothermal, the divergence required is very small. Thus our losses can be held to 4-5% of the kinetic energy in the mixing section. Compare this with an engine that needs to transfer the energy to a mechanical system—turbines rarely exceed 95% efficiency, and compressors rarely exceed 85% efficiency, thus losing almost 20% of the input power. When the thermodynamic efficiency is only 10% this means we will not have any output power available—the engine will require mechanical power to take the fluid through the cycle. An interesting option is to extract the output energy at an earlier point in the cycle. For example, one could place a turbine at the input of the engine, causing a small drop in temperature and pressure, and then run in the mode where the compression continues until no kinetic energy is left, but returning the air to ambient pressure.

Obviously, the droplet size has to be small, otherwise the assumption that the water picks up the heat of compression of the air is invalid. Another disadvantage if the droplets are large is that the momentum and kinetic energy of the injected water will not be effectively utilized in compressing the gas, and will be wasted when the drops impact the walls of the collection chamber.

Calculation of the parameters is done by successive approximation. 1) An output temperature is assumed, and we compute the energy required to adiabatically compress the gaseous portion to this temperature, and then 2) the energy required to isothermally compress it the rest of the way back to ambient pressure. The heat energy released by the isothermal compression must be picked up evaporating water, and 3) gives us the amount of additional water that must be injected. Since all of it has evaporated according to the assumption in the previous step, 4) we compute the vapor pressure of water in a mixture with that much water vapor. 5) We then adjust the output temperature to be the temperature of saturated water vapor with that vapor pressure. This process is iterated until the saturated vapor pressure of the injected water corresponds to the output temperature. This gives us the minimum temperature where cooling is primarily due to evaporation of water. Additional water can be injected, but beyond this point cooling is primarily due to raising the temperature of the injected water and requires a lot more water per degree drop in air temperature.

Assuming we started with ambient conditions at 1 atm, 100 F and RH=80% this calculation gives us 2% injected water to dry air mass ratio, and an exhaust of about 106 m/s at 110 F. This can then be used to size the apparatus throat to exit area ratio, which in this case is approximately 1::2.

Note that since this air engine uses water and does not attempt to recondense it, it is not a closed cycle, and the corresponding closed cycle is operating between the high point temperature and the dew point temperature of the air.

One of the difficulties with such an engine, especially when designing for around 2-4 KW of output power, is the very small amount of water flow (~4 ml/sec). A lot of energy gets wasted due to viscous forces in the injector, and it is subject to severe clogging problems due to the very narrow bores required (~0.1 mm diameter). FIG. 4 shows an alternate form of the air engine. Nozzles 18 arranged in a circle create a spinning air mass around a spinning wheel 19. Water flows to the centre of the wheel via a pipe 20 in the axle of the wheel and is ejected at the rim 21. The enclosure around the wheel 22 is shaped so that a narrow gap 23 is aligned with the water spray, and expands out slowly into a collection chamber 24 around the gap. A motor 25 spins the wheel 19 so that there is very little relative motion between the air and the wheel (except during startup). There is also very little relative motion between the water and the wheel, so the injector losses practically disappear. This is the preferred embodiment.

The wheel can be dispensed with if one can accept the loss caused by the mismatched speeds of air and water and one has some other way of starting the engine, such as by sucking air out of the center of the enclosure 22, or out of the collection chamber 24. Air drawn into the enclosure 22 via the nozzles 18 would be spinning, and water sprayed into the center of this spinning air mass would cause the air to exit through the gap 23. The water must still be atomized finely and sprayed outwards from the center of the enclosure 22 that would have contained the wheel towards the gap 23.

I claim:

1. A device to capture solar energy as heat and convert it to free energy, comprised of:
    a screen to block turbulence or wind from reaching the collector surface while allowing air and radiation to do so;
    a collector surface that absorbs the solar radiation, and is separated from the screen by a gap;
    holes in the collector surface through which the air heated by conduction from the collector surface may be drawn into the solar collector;
    a spectrally selective coating on either the screen or the collector surface, or both, that reflects longer wave radiation, and that either absorbs shorter wave radiation in the case of the collector surface coating, or transmits shorter wave radiation in the case of a coating on the screen;
    an insulated enclosure under or behind the collector surface from which hot air may be drawn;
    one or more nozzles to expand hot air and convert some of its heat energy into kinetic energy;
    a mixing section into which the nozzles deliver the air;
    a water injector that atomizes and sprays water through the mixing section at high velocity thus cooling the air;
    the velocity of the spray chosen so there is little relative motion between the air and water;
    a diffuser that compresses the mixture at low pressure and with high kinetic energy back to the input pressure or above;
    the arrangement of nozzle, injector and diffuser being such that the mechanical energy for compression is not extracted from the expanded gas, but simply left in it until it undergoes recompression;
    the nozzles are arranged in a circle and oriented to produce a swirling air mass above the water injector;
    the water injector is a spinning wheel onto which water is dropped, or in whose axle a small channel delivers water to the center of the wheel;
    the mixing section and diffuser is an annular gap in the enclosure for the wheel that is aligned with the water spray from the spinning wheel;
    and the motive force for the wheel is a small motor that drives the wheel.

2. The device of claim 1 where:
    the screen is made of glass roofing tiles;
    the coating is transparent and on the underside of the glass tiles.

3. The device of claim 1 where:
    the screen is made of glass roofing tiles and a film underneath the glass tiles with holes in the film;
    the coating is transparent and on the underside of the film.

4. The device of claim 1 where:
    the screen is a fine mesh;
    the collector surface is aluminium plate or aluminium foil, with small holes in them;
    and coated with the opaque spectrally selective coating on the side facing the sun.

5. The device of claim 1:
    which has a turbine that converts the remaining kinetic energy or the pressure energy at the exit of the diffuser into rotational mechanical energy.

* * * * *